United States Patent
Prenzel et al.

(10) Patent No.: US 8,574,392 B2
(45) Date of Patent: Nov. 5, 2013

(54) METHOD FOR ANTICORROSIVE TREATMENT OF METAL SURFACES

(75) Inventors: Alexander Prenzel, Hamburg (DE); Jennifer Beschmann, Hamburg (DE); Matthias Seibert, Hamburg (DE)

(73) Assignee: TESA SE, Hamburg (DE)

( * ) Notice: Subject to any disclaimer, the term of this patent is extended or adjusted under 35 U.S.C. 154(b) by 34 days.

(21) Appl. No.: 13/146,458

(22) PCT Filed: Jan. 6, 2010

(86) PCT No.: PCT/EP2010/050072
§ 371 (c)(1),
(2), (4) Date: Aug. 10, 2011

(87) PCT Pub. No.: WO2010/086196
PCT Pub. Date: Aug. 5, 2010

(65) Prior Publication Data
US 2011/0284156 A1   Nov. 24, 2011

(30) Foreign Application Priority Data
Jan. 29, 2009 (DE) .......... 10 2009 006 593

(51) Int. Cl.
*B29C 65/02* (2006.01)
*B29C 65/50* (2006.01)
*B32B 37/04* (2006.01)

(52) U.S. Cl.
USPC .......... 156/307.7; 156/309.6; 427/388.2

(58) Field of Classification Search
USPC .......... 156/307.7, 309.6, 275.5, 247; 427/388.1
See application file for complete search history.

(56) References Cited

U.S. PATENT DOCUMENTS

| | | | |
|---|---|---|---|
| 4,581,429 A | 4/1986 | Solomon et al. | |
| 5,789,487 A | 8/1998 | Matyjaszewski et al. | |
| 5,854,364 A | 12/1998 | Senninger et al. | |
| 5,945,491 A | 8/1999 | Matyjaszewski et al. | |
| 6,350,791 B1 * | 2/2002 | Feichtmeier et al. | 522/81 |
| 2008/0302448 A1 | 12/2008 | Frey et al. | |
| 2010/0104864 A1 * | 4/2010 | Zollner et al. | 428/354 |

FOREIGN PATENT DOCUMENTS

| | | |
|---|---|---|
| DE | 102006006910 B3 | 5/2007 |
| DE | 102007016950 A1 * | 10/2008 |
| EP | 0735052 A2 | 10/1996 |
| EP | 1405873 A2 | 4/2001 |
| EP | 1001893 B1 | 11/2004 |
| WO | 9624620 A1 | 8/1996 |
| WO | 9801478 A1 | 1/1998 |
| WO | 9813392 A1 | 4/1998 |
| WO | 9844008 A1 | 10/1998 |
| WO | 9931144 A1 | 6/1999 |

* cited by examiner

*Primary Examiner* — Katarzyna Wyrozebski Lee
*Assistant Examiner* — Scott W Dodds
(74) *Attorney, Agent, or Firm* — Norris McLaughlin & Marcus PA

(57) ABSTRACT

A method for anticorrosive treatment of metal surfaces, especially at edges and transitions of the metal components, characterized in that a self-adhesive tape is applied to the metal surface and the self-adhesive tape contains at least one layer with a material which is heated such that the material melts onto the metal surface and thus forms an anticorrosive layer.

16 Claims, No Drawings

METHOD FOR ANTICORROSIVE TREATMENT OF METAL SURFACES

This application is a 371 of PCT/EP2010/050072, filed Jan. 6, 2010, which claims foreign priority benefit under 35 U.S.C. §119 of the German Patent Application No. 10 2009 006 593.8 filed Jan. 29, 2009, the disclosures of which are incorporated herein by reference.

The present invention relates to a method for the corrosion control treatment of metal surfaces, having the features of the preamble of claim 1, and also to the use of a self-adhesive for the corrosion control treatment of metal surfaces.

Metal components are used in a diversity of sectors. They are exposed therein to any of a very wide variety of weathering conditions, and so often a corrosion control treatment is necessary. For this purpose, especially for full-area application of a corrosion control layer to metal components, a variety of methods are known. DE 10 2006 006 910 B3, for example, discloses a method in which a corrosion control layer in the form of a zinc lamellae coating is applied to the metal surfaces that are to be protected. The zinc lamellae coating is applied by means of a dipping or spraying method. In another method known from the prior art, a corrosion control treatment is effected by immersion of the metal surfaces into a cathodically depositable electrocoat material (DE 10 2005 059 314 A1). A feature common to the two above-mentioned methods is that the corrosion control layer is applied over a relatively large area, more particularly the full area, of the metal surface to be treated.

In the automobile industry in particular, however, there is a need also to protect small areas, these being the surface of edges and transitions of metal components, from corrosion, by means of a corrosion control layer. For this purpose, in general, a precision seam seal is applied manually or by means of a robot. Material used for the precision seam is typically pumpable PVC. This pumpable PVC is applied locally to the metal surface, by spraying, and then spread smoothly by means of a brush. In this method, which is fundamentally suitable for edges and transitions, it is difficult to produce the precision seam in the optical quality that is needed in vehicle construction. Instead, the surface often remains rough, and an uneven application is visible to the naked eye.

The problem on which the present invention is based, therefore, is that of specifying a method for the corrosion control treatment of metal surfaces that can be carried out without great cost and complexity and that can also be used in particular for protecting edges and transitions of metal components.

The problem indicated above is solved with a method for the corrosion control treatment of metal surfaces that has the features embodied in the present claims.

In accordance with the invention it has been recognized, first of all, that, given appropriate treatment, self-adhesive tapes form a good corrosion control layer on metal surfaces and are suitable, accordingly, for the corrosion control treatment. In tests, moreover, it was found that, by means of suitable self-adhesive tapes, smooth surfaces can be formed. Smooth surfaces of this kind have a uniform surface structure to the naked eye of a viewer, and are planar. The use of a self-adhesive tape for forming a corrosion control layer on metal surfaces is particularly advantageous on account of the ease of operation. In view of the self-adhesive effect, the adhesive tape can be applied particularly easily to the surfaces, where it can be fixed preliminarily prior to further operating steps. In addition, an adhesive tape of this kind is suitable especially for use on small areas.

With the method of the invention, the self-adhesive tape is applied to the respective metal surface and subsequently heated. The self-adhesive tape comprises at least one layer of the invention which melts as a result of heating—that is, on heating, it spreads over the metal surface and in so doing forms a continuous corrosion control layer. By virtue of the fact that the adhesive tape is self-adhesive and ultimately forms the corrosion control layer, the application can take place very simply, in particular at edges and transitions between different metal components as well. The tackiness of the adhesive tape allows preliminary fixing before the corrosion control layer is formed by the heating. Furthermore, the self-adhesive tape can be applied uniformly even to small areas, something which with conventional methods, such as the sprayed application of paint, for example, is possible only with difficulty and using further assistants, such as temporary protective films.

It has been found in particular that, given selection of an appropriate self-adhesive tape, the corrosion control layer is formed with a substantially smooth surface—in other words, to a viewer, the surface of the corrosion control layer is of even and planar form.

The self-adhesive tape comprises at least one layer of the invention, based on polyacrylates and/or polymethacrylates, which per se is self-adhesive and/or heat-activatable and is therefore suitable for forming the corrosion control layer.

In another preferred variant, heat-activatable pressure-sensitive adhesives based on poly(meth)acrylate are used. The heat-activatable material advantageously comprises a polymer which comprises (a1) 70% to 100% by weight of acrylic esters and/or methacrylic esters and/or the free acids thereof, with the formula

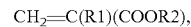

where R1 is H and or CH$_3$ and R2 is H and/or alkyl chains having 1 to 30 C atoms; and (a2) 0% to 30% by weight of olefinically unsaturated monomers having functional groups, the weight figures being based on the polymer.

For the monomers (a1)) it is preferred to use acrylic monomers, comprising acrylic and methacrylic esters with alkyl groups consisting of 1 to 14 C atoms. Specific examples, without wishing to be restricted by this enumeration, are methyl acrylate, methyl methacrylate, ethyl acrylate, ethyl methacrylate, propyl acrylate, propyl methacrylate, n-butyl acrylate, n-butyl methacrylate, n-pentyl acrylate, n-hexyl acrylate, n-hexyl methacrylate, n-heptyl acrylate, n-octyl acrylate, n-nonyl acrylate, lauryl acrylate, stearyl acrylate, stearyl methacrylate, behenyl acrylate, and the branched isomers thereof, such as 2-ethylhexyl acrylate, for example. Further classes of compound for use, which may likewise be added in small amounts under (a1), are cyclohexyl methacrylates, isobornyl acrylate, and isobornyl methacrylates.

Preference is given for (a2) to acrylic monomers corresponding to the following general

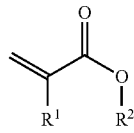

where $R^1$ is H and/or CH$_3$ and the radical —OR$^2$ is a functional group or comprises a functional group which supports subsequent thermal and/or UV and/or electron-beam crosslinking of the adhesive.

Particularly preferred examples for component (a2) are hydroxyethyl acrylate, hydroxypropyl acrylate, hydroxyethyl methacrylate, hydroxypropyl methacrylate, allyl alcohol, maleic anhydride, itaconic anhydride, itaconic acid, acrylamide and glycidyl methacrylate, benzyl acrylate, benzyl methacrylate, phenyl acrylate, phenyl methacrylate, tert-butylphenyl acrylate, tert-butylphenyl methacrylate, phenoxyethyl acrylate, phenoxyethyl methacrylate, 2-butoxyethyl methacrylate, 2-butoxyethyl acrylate, dimethylaminoethyl methacrylate, dimethylaminoethyl acrylate, diethylaminoethyl methacrylate, diethylaminoethyl acrylate, cyanoethyl methacrylate, cyanoethyl acrylate, glyceryl methacrylate, 6-hydroxyhexyl methacrylate, N-tert-butylacrylamide, N-methylolmethacrylamide, N-(butoxymethyl)methacrylamide, N-methylolacrylamide, N-(ethoxymethyl) acrylamide, N-isopropylacrylamide, vinylacetic acid, tetrahydrofurfuryl acrylate, β-acryloyloxypropionic acid, trichloroacrylic acid, fumaric acid, crotonic acid, aconitic acid, dimethylacrylic acid, this enumeration not being conclusive.

Likewise used preferably for component (a2) are aromatic vinyl compounds, where the aromatic rings consist preferably of C4 to C18 units and may also contain heteroatoms. Particularly preferred examples are styrene, 4-vinylpyridine, N-vinylphthalimide, methylstyrene, 3,4-dimethoxystyrene, 4-vinylbenzoic acid, this enumeration not being conclusive.

For the polymerization the monomers are selected such that the resultant polymers can be used as heat-activatable pressure-sensitive adhesives, more particularly such that the resulting polymers have pressure-sensitive adhesion properties in line with the "Handbook of Pressure Sensitive Adhesive Technology" by Donatas Satas (van Nostrand, New York 1989). For these applications, the static glass transition temperature of the resulting polymers is situated advantageously above 30° C.

In order to obtain a glass transition temperature $T_{g,A}$ for the polymers of $T_{g,A} \geq 30°$ C., in line with the comments above, the monomers are very preferably selected, and the quantitative composition of the monomer mixture advantageously selected, such as to give the desired $T_{g,A}$ value for the polymer in accordance with the Fox equation (E1) (cf. T. G. Fox, Bull. Am. Phys. Soc. 1956, 1, 123).

$$\frac{1}{T_g} = \sum_n \frac{W_n}{T_{g,n}} \tag{E1}$$

In this equation, n represents the serial number of the monomers used, $W_n$ the mass fraction of the respective monomer n (% by weight), and $T_{g,n}$ the respective glass transition temperature of the homopolymer of the respective monomer n in K.

The different preparation processes (polymerization processes) for polyacrylate pressure-sensitive adhesives of this kind are described later on below.

For the anchoring of the heat-activatable polymers it may be advantageous for the polymer to be treated by plasma or corona prior to coating. For atmospheric plasma treatment for example, apparatus from the company Plasmatreat is suitable.

Moreover, for the operation and for the anchoring of the layer with further possible layers or with a film based on polyester, polyamide, polymethacrylate, PVC, etc, it may be of advantage if a chemical anchoring takes place, for example, via a primer.

Particular preference is given to using a polyacrylate pressure-sensitive adhesive which comprises a polymer which in respect of the polymer comprises (b1) 70% to 100% by weight of acrylic esters and/or methacrylic esters and/or the free acids thereof, with the formula

CH2=CH(R3)(COOR4), where R3 is H and/or $CH_3$ and R4 is H and/or alkyl chains having 1 to 30 C atoms; and (b2) 0 to 30% by weight of olefinically unsaturated monomers having functional groups, the weight figures being based on the polymer.

For the monomers (b1) it is preferred to use acrylic monomers, comprising acrylic and methacrylic esters with alkyl groups consisting of 4 to 14 C atoms, preferably 4 to 9 C atoms. Specific examples, without wishing to be restricted by this enumeration, are n-butyl acrylate, n-pentyl acrylate, n-hexyl acrylate, n-heptyl acrylate, n-octyl acrylate, n-nonyl acrylate, lauryl acrylate, stearyl acrylate, behenyl acrylate, and the branched isomers thereof, such as 2-ethylhexyl acrylate, for example. Further classes of compound for use, which may likewise be added in small amounts under (b1), are methyl methacrylates, cyclohexyl methacrylates, isobornyl acrylate, and isobornyl methacrylates.

Used with greater preference for the monomers (b2) are vinyl esters, vinyl ethers, vinyl halides, vinylidene halides, vinyl compounds with aromatic rings and heterocycles in a position. Here again, a number of non-restricting examples may be given: vinyl acetate, vinyl formamide, vinylpyridine, ethyl vinyl ether, vinyl chloride, vinylidene chloride, and acrylonitrile. For the monomers (b2), particular preference is given to using monomers having the following functional groups: hydroxyl, carboxyl, epoxy, acid-amide, isocyanato or amino groups.

In one advantageous variant, for (b2), acrylic monomers in line with the following general formula are used,

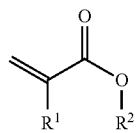

where $R^1$ is H or $CH_3$ and the radical —$OR^2$ is or comprises a functional group which allows subsequent thermal, UV and/or electron-beam crosslinking of the pressure-sensitive adhesive.

Particularly preferred examples for component (b2) are hydroxyethyl acrylate, hydroxypropyl acrylate, hydroxyethyl methacrylate, hydroxypropyl methacrylate, allyl alcohol, maleic anhydride, itaconic anhydride, itaconic acid, acrylamide and glycidyl methacrylate, benzyl acrylate, benzyl methacrylate, phenyl acrylate, phenyl methacrylate, tert-butylphenyl acrylate, tert-butylphenyl methacrylate, phenoxyethyl acrylate, phenoxyethyl methacrylate, 2-butoxyethyl methacrylate, 2-butoxyethyl acrylate, dimethylaminoethyl methacrylate, dimethylaminoethyl acrylate, diethylaminoethyl methacrylate, diethylaminoethyl acrylate, cyanoethyl methacrylate, cyanoethyl acrylate, glyceryl methacrylate, 6-hydroxyhexyl methacrylate, N-tert-butylacrylamide, N-methylolmethacrylamide, N-(butoxymethyl)methacrylamide, N-methylolacrylamide, N-(ethoxymethyl) acrylamide, N-isopropylacrylamide, vinylacetic acid, tetrahydrofurfuryl acrylate, β-acryloyloxypropionic acid, trichloroacrylic acid, fumaric acid, crotonic acid, aconitic acid, dimethylacrylic acid, this enumeration not being conclusive.

In a further preferred variant, for component (b2), aromatic vinyl compounds are used, where the aromatic rings consist preferably of C4 to C18 units and may also contain heteroatoms. Particularly preferred examples are styrene, 4-vinylpyridine, N-vinylphthalimide, methylstyrene, 3,4-dimethoxystyrene, 4-vinylbenzoic acid, this enumeration not being conclusive.

For the polymerization the monomers are selected such that the resultant polymers can be used as industrially applicable pressure-sensitive adhesives, more particularly such that the resulting polymers have pressure-sensitive adhesion properties in line with the "Handbook of Pressure Sensitive Adhesive Technology" by Donatas Sates (van Nostrand, New York 1989). Here again, the desired glass transition temperature can be controlled through the application of the Fox equation (E1) in the context of the compilation of the monomer mixture on which the polymerization is based. For the pressure-sensitive adhesive of the layer B, the static glass transition temperature of the resulting polymer is advantageously below 15° C.

For the preparation of the polyacrylate pressure-sensitive adhesives it is advantageous to carry out conventional free-radical polymerizations or controlled free-radical polymerizations. For the polymerizations which proceed by a free-radical mechanism it is preferred to use initiator systems which additionally comprise further free-radical initiators for the polymerization, more particularly thermally decomposing, free-radical-forming azo or peroxo initiators. In principle, however, all customary initiators which are familiar to the skilled person for acrylates are suitable. The production of C-centered free radicals is described in Houben-Weyl, Methoden der Organischen Chemie, Vol. E 19a, pages 60 to 147. These methods are preferentially employed analogously.

Examples of free-radical sources are peroxides, hydroperoxides, and azo compounds. Some nonlimiting examples of typical free-radical initiators that may be mentioned here include potassium peroxodisulfate, dibenzoyl peroxide, cumene hydroperoxide, cyclohexanone peroxide, di-tert-butyl peroxide, azodiisobutyronitrile, cyclohexylsulfonyl acetyl peroxide, diisopropyl percarbonate, tert-butyl peroctoate, and benzpinacol. A particularly preferred free-radical initiator used is 1,1'-azobis(cyclohexanecarbonitrile) (Vazo 88® from DuPont).

The average molecular weights $M_n$ of the pressure-sensitive adhesives (PSAs) formed in the free-radical polymerization are very preferably selected such that they are situated within a range from 20 000 to 2 000 000 g/mol; specifically for further use as pressure-sensitive hotmelts, PSAs having average molecular weights $M_n$ of 100 000 to 500 000 g/mol are prepared. The average molecular weight is determined via size exclusion chromatography (SEC) or matrix-assisted laser desorption/ionization mass spectrometry (MALDI-MS).

The polymerization may be carried out in bulk, in the presence of one or more organic solvents, in the presence of water, or in mixtures of organic solvents and water. The aim is to minimize the amount of solvent used. Suitable organic solvents are pure alkanes (for example, hexane, heptane, octane, isooctane), aromatic hydrocarbons (for example, benzene, toluene, xylene), esters (for example, ethyl acetate, propyl, butyl or hexyl acetate), halogenated hydrocarbons (for example, chlorobenzene), alkanols (for example, methanol, ethanol, ethylene glycol, ethylene glycol monomethyl ether), and ethers (for example, diethyl ether, dibutyl ether) or mixtures thereof. The aqueous polymerization reactions may be admixed with a water-miscible or hydrophilic co-solvent, in order to ensure that the reaction mixture is present in the form of a homogeneous phase during monomer conversion. Co-solvents which can be used with advantage for the present invention are selected from the following group, consisting of aliphatic alcohols, glycols, ethers, glycol ethers, pyrrolidines, N-alkylpyrrolidinones, N-alkylpyrrolidones, polyethylene glycols, polypropylene glycols, amides, carboxylic acids and salts thereof, esters, organic sulfides, sulfoxides, sulfones, alcohol derivatives, hydroxy ether derivatives, amino alcohols, ketones and the like, and also derivatives and mixtures thereof.

Depending on conversion and temperature, the polymerization time is between 4 and 72 hours. The higher the reaction temperature that can be selected, in other words the higher the thermal stability of the reaction mixture, the lower the reaction time that can be selected.

For the thermally decomposing initiators, the introduction of heat is essential to initiate the polymerization. For the thermally decomposing initiators, the polymerization may be initiated by heating to 50 to 160° C., depending on initiator type.

For free-radical stabilization in a favorable procedure use is made of nitroxides, such as, for example 2,2,5,5-tetramethyl-1-pyrrolidinyloxyl (PROXYL), 3-carbamoyl-PROXYL, 2,2-dimethyl-4,5-cyclohexyl-PROXYL, 3-oxo-PROXYL, 3-hydroxylimine-PROXYL, 3-aminomethyl-PROXYL, 3-methoxy-PROXYL, 3-tert-butyl-PROXYL, 3,4-di-tert-butyl-PROXYL—2,2,6,6-tetramethyl-1-piperidinyloxyl pyrrolidinyloxyl (TEMPO), 4-benzoyloxy-TEMPO, 4-methoxy-TEMPO, 4-chloro-TEMPO, 4-hydroxy-TEMPO, 4-oxo-TEMPO, 4-amino-TEMPO, 2,2,6,6-tetraethyl-1-piperidinyloxyl, 2,2,6-trimethyl-6-ethyl-1-piperidinyloxyl—N-tert-butyl 1-phenyl-2-methylpropyl nitroxide—N-tert-butyl 1-(2-naphthyl)-2-methylpropyl nitroxide—N-tert-butyl 1-diethylphosphono-2,2-dimethylpropyl nitroxide—N-tert-butyl 1-dibenzylphosphono-2,2-dimethylpropyl nitroxide—N-(1-phenyl-2-methyl-propyl) 1-diethylphosphono-1-methylethyl nitroxide—di-tert-butyl nitroxide—diphenyl nitroxide—tert-butyl-tert-amyl nitroxide.

A series of further polymerization methods whereby the adhesives can be prepared in alternative procedures can be selected from the prior art: U.S. Pat. No. 4,581,429 A discloses a controlled-growth free-radical polymerization process which employs as its initiator a compound of the formula R'R"N—O—Y, in which Y is a free radical species which is able to polymerize unsaturated monomers. The reactions, however, in general have low conversion rates. A particular problem is the polymerization of acrylates, which takes place only to very low yields and molar masses. WO 98/13392 A1 describes open-chain alkoxyamine compounds which have a symmetrical substitution pattern. EP 735 052 A1 discloses a process for preparing thermoplastic elastomers having narrow molar mass distributions. WO 96/24620 A1 describes a polymerization process in which very specific free-radical compounds are used, such as, for example, phosphorus-containing nitroxides based on imidazolidine. WO 98/44008 A1 discloses specific nitroxyls based on morpholines, piperazinones, and piperazinediones. DE 199 49 352 A1 describes heterocyclic alkoxyamines as regulators in controlled-growth free-radical polymerizations. Corresponding further developments of the alkoxyamines or of the corresponding free nitroxides improve the efficiency for the preparation of polyacrylates (Hawker, paper given to the National meeting of the American Chemical Society, spring 1997; Husemann, paper given to the IUPAC World Polymer Meeting 1998, Gold Coast).

As a further controlled polymerization method it is possible advantageously, for the synthesis of block copolymers, to employ Atom Transfer Radical Polymerization (ATRP), the initiator used comprising preferably monofunctional or difunctional secondary or tertiary halides and the halide or halides being abstracted using complexes of Cu, Ni, Fe, Pd, Pt, Ru, Os, Rh, Co, Ir, Ag or Au (EP 0 824 111 A1; EP 826 698 A1; EP 824 110 A1; EP 841 346 A1; EP 850 957 A1). The various possibilities of ATRP are described further in the texts of U.S. Pat. Nos. 5,945,491 A, 5,854,364 A and 5,789,487 A.

Furthermore, the polymer used in accordance with the invention can be prepared advantageously via an anionic polymerization. As the reaction medium here it is preferred to use inert solvents, such as aliphatic and cycloaliphatic hydrocarbons, for example, or else aromatic hydrocarbons.

The living polymer is represented generally by the structure PL(A)-Me, where Me is a metal from Group I of the Periodic Table, such as lithium, sodium or potassium, for example, and PL(A) is a growing polymer block of the monomers A. The molar mass of the polymer under preparation is dictated by the ratio of initiator concentration to monomer concentration.

Examples of suitable polymerization initiators include n-propyllithium, n-butyllithium, sec-butyllithium, 2-naphthyllithium, cyclohexyllithium or octyllithium, this enumeration making no claim to completeness. Furthermore, initiators based on samarium complexes are known for the polymerization of acrylates (Macromolecules 1995, 28, 7886) and can be used here.

It is also possible, furthermore, to use difunctional initiators, such as, for example, 1,1,4,4-tetraphenyl-1,4-dilithiobutane or 1,1,4,4-tetraphenyl-1,4-dilithioisobutane. Co-initiators may likewise be employed. Suitable co-initiators include lithium halides, alkali metal alkoxides or alkylaluminum compounds. In one very preferred variant the ligands and co-initiators are selected such that acrylate monomers, such as n-butyl acrylate and 2-ethylhexyl acrylate, for example, can be polymerized directly and do not have to be generated in the polymer by transesterification with the corresponding alcohol.

As a very preferred preparation procedure, a variant of the RAFT polymerization (reversible addition-fragmentation chain transfer polymerization) is carried out. The polymerization procedure is described comprehensively in specifications WO 98/01478 A1 and WO 99/31144 A1, for example. Particularly advantageously suitable for the preparation are trithiocarbonates of the general structure R'''—S—C(S)—S—R''' (Macromolecules 2000, 33, 243-245).

In one very advantageous variant, for example, the trithiocarbonates (TTC1) and (TTC2) or the thio compounds (THI1) and (THI2) are used for the polymerization, where φ is a phenyl ring which may be unfunctionalized or functionalized by alkyl or aryl substituents which are linked directly or via ester or ether bridges; a cyano group; or a saturated or unsaturated aliphatic radical. The phenyl ring φ may optionally carry one or more polymer blocks, examples being polybutadiene, polyisoprene, polychloroprene or poly(meth)acrylate, which may be constructed in line with the definition for P(A) or P(B), or polystyrene, to name but a few. Functionalizations may be, for example, halogens, hydroxyl groups, epoxide groups, groups containing nitrogen or groups containing sulfur, without this enumeration making any claim to completeness.

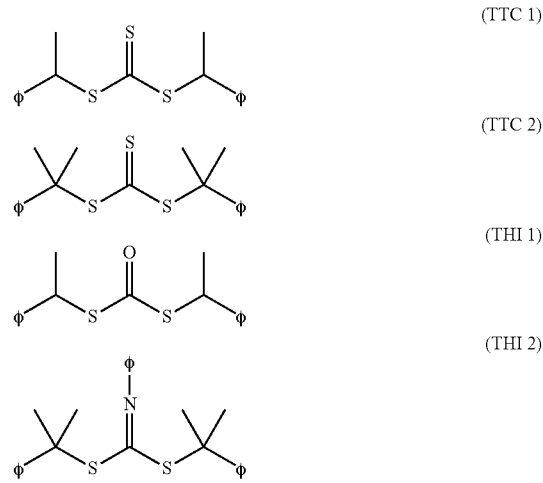

In conjunction with the abovementioned controlled-growth polymerizations proceeding via free-radical mechanism, initiator systems are preferred which further comprise additional free-radical initiators for the polymerization, more particularly thermally decomposing, free-radical-forming azo or peroxo initiators. Suitable in principle for this purpose, however, are all of the customary initiators known for acrylates. The production of C-centered free radicals is described in Houben-Weyl, Methoden der Organischen Chemie, Vol. E 19a, p. 60ff. These methods are preferentially employed. Examples of free-radical sources are peroxides, hydroperoxides, and azo compounds. A number of nonexclusive examples of typical free-radical initiators that may be mentioned here include the following: potassium peroxodisulfate, dibenzoyl peroxide, cumene hydroperoxide, cyclohexanone peroxide, cyclohexylsulfonyl acetyl peroxide, di-tert-butyl peroxide, azodiisobutyronitrile, diisopropyl percarbonate, tert-butyl peroctoate, benzpinacol. One very preferred variant uses, as free-radical initiator, 1,1'-azobis(cyclohexylnitrile) (Vazo 88®, DuPont) or 2,2-azobis(2-methylbutanednitrile) (Vazo 67®, DuPont). Furthermore, it is also possible to use free-radical sources which release free radicals only under UV irradiation.

In the case of the conventional RAFT procedure, polymerization is carried out usually only to low conversions (WO 98/01478 A1), in order to realize extremely narrow molecular weight distributions. As a result of the low conversions, however, these polymers cannot be used as PSAs, and more particularly not as hotmelt PSAs, since the high fraction of residual monomers adversely affects the technical adhesive properties; the residual monomers contaminate the solvent recyclate in the concentration procedure; and the corresponding self-adhesive tapes would exhibit very high outgassing behavior.

For advantageous further development, the PSAs may be admixed with resins. Tackifying resins for addition that can be used include, without exception, all tackifying resins which are already known and are described in the literature. As representatives, mention may be made of the pinene resins, indene resins, and rosins, their disproportionated, hydrogenated, polymerized, and esterified derivatives and salts, the aliphatic and aromatic hydrocarbon resins, terpene resins and terpene-phenolic resins, and also $C_5$, $C_9$, and other hydrocarbon resins. Any desired combinations of these and further resins may be used in order to adjust the properties of the resultant adhesive in accordance with requirements. Generally speaking, it is possible to use all resins that are compatible (soluble) with the polyacrylate in question; reference may be made more particularly to all aliphatic, aromatic, and alkylaromatic hydrocarbon resins, hydrocarbon resins based on pure monomers, hydrogenated hydrocarbon resins, functional hydrocarbon resins, and natural resins. Express reference is made to the depiction of the state of knowledge in the "Handbook of Pressure Sensitive Adhesive Technology" by Donatas Sates (van Nostrand, 1989).

Furthermore, it is possible optionally for plasticizers (plasticizing agents), fillers (for example, fibers, carbon black, zinc oxide, titanium dioxide, chalk, solid or hollow glass beads, microbeads made of other materials, silica, silicates), nucleating agents, expandants, compounding agents and/or aging inhibitors, in the form for example of primary and secondary antioxidants or in the form of light stabilizers, to be added.

The internal strength (cohesion) of the PSA is increased preferably by crosslinking. For this purpose, compatible crosslinker substances may optionally be added to the acrylate-containing PSAs. Examples of suitable crosslinkers include metal chelates, polyfunctional isocyanates, polyfunctional amines, polyfunctional epoxides or polyfunctional alcohols. Polyfunctional acrylates as well may be used with advantage as crosslinkers for actinic irradiation.

Particularly preferred are polyacrylate materials which are crosslinkable. Crosslinking is accomplished preferably in the form of thermal crosslinking, during the melting of the polyacrylate layer of the invention of the self-adhesive tape, which may be self-adhesive and/or heat-activatable. Radiation crosslinking or other crosslinking methods, however, can also be employed. As a result of the crosslinking, the self-adhesive material becomes significantly less susceptible to high temperatures, and so the self-adhesive material is then no longer able to melt. The crosslinking, in particular, thus allows the use of self-adhesive tapes which per se, on account of their deficient temperature stability, could not be used as a productive component—that is, a component which remains durably.

Crosslinking may, as described, take place in different ways. On the one hand, crosslinking may take place during or after the melting of the self-adhesive tape, by radiation, not only via UV rays but also with the aid of electron beams.

Crosslinking by thermal energy, in other words during the melting of the acrylate layer of the self-adhesive tape, may take place with polyfunctional isocyanates, polyfunctional epoxides, polyfunctional amines, and polyfunctional alcohols, and further thermal crosslinkers known to the skilled person. EP 1 001 893 B1 and EP 13734425 B1 cite examples of such thermal crosslinking during the above-stated applications, and also cite reactive systems such as, cyanoacrylates for example—these, however, have the drawback that the adhesive tapes can be stored only at low temperatures without losing effectiveness, and must be first heated again in turn for application, in order that the adhesive tapes remain adhering to the substrate.

Surprisingly, and nonobviously to the skilled person, it has been found that the combination of a polyfunctional epoxide and a urethane and/or urea derivative as crosslinkers for the polyacrylate layer of the invention in the self-adhesive tape, in terms of storage stability, processibility and the desired crosslinking on melting, provides a very good solution to the problem described above. Particularly suitable are urea derivatives which have at least two urea functionalities and also undergo thermal decomposition at the melting temperature or in the region of the melting temperature, releasing an isocyanate and an amine. The amine, which functions as a blocking agent for the isocyanate, surprisingly also possesses the capacity to react as an accelerator for the epoxide crosslinking, without the epoxide not reacting with the polyacrylate. Below the melting temperature, the self-adhesive tape with the polyacrylate layer of the invention is storage-stable, and there is no crosslinking reaction.

One example of urea derivatives of the invention of this kind is the Dyhard® UR 500 from EVONIK.

Substances containing epoxide groups that are used are, in particular, polyfunctional epoxides, in other words those which have at least two epoxide units per molecule (i.e., are at least difunctional). These compounds may be aromatic compounds and aliphatic compounds.

Outstandingly suitable polyfunctional epoxides are oligomers of epichlorohydrin, epoxy ethers of polyhydric alcohols [more particularly ethylene, propylene, and butylene glycols, polyglycols, thiodiglycols, glycerol, pentaerythritol, sorbitol, polyvinyl alcohol, polyallyl alcohol, and the like], epoxy ethers of polyhydric phenols [more particularly resorcinol, hydroquinone, bis(4-hydroxyphenyl)methane, bis(4-hydroxy-3-methylphenyl)methane, bis(4-hydroxy-3,5-dibromophenyl)methane, bis(4-hydroxy-3,5-difluorophenyl)methane, 1,1-bis(4-hydroxyphenyl)ethane, 2,2-bis(4-hydroxyphenyl)propane, 2,2-bis(4-hydroxy-3-methylphenyl)propane, 2,2-bis(4-hydroxy-3-chlorophenyl)propane, 2,2-bis(4-hydroxy-3,5-dichlorophenyl)propane, 2,2-bis(4-hydroxy-3,5-dichlorophenyl)propane, bis(4-hydroxyphenyl)phenylmethane, bis(4-hydroxyphenyl)phenylmethane, bis(4-hydroxy-phenyl)diphenylmethane, bis(4-hydroxyphenyl)-4'-methylphenylmethane, 1,1-bis-(4-hydroxyphenyl)-2,2,2-trichloroethane, bis(4-hydroxyphenyl)(4-chlorophenyl)methane, 1,1-bis(4-hydroxyphenyl)cyclohexane, bis(4-hydroxyphenyl)cyclohexylmethane, 4,4'-dihydroxybiphenyl, 2,2'-dihydroxybiphenyl, 4,4'-dihydroxydiphenyl sulfone] and also the hydroxyethyl ethers thereof, phenol-formaldehyde condensation products, such as phenol alcohols, phenol aldehyde resins, and the like, S- and N-containing epoxides (for example, N,N-diglycidylaniline, N,N'-dimethylglycidyl-4,4-diaminophenylmethane), and also epoxides which have been prepared by conventional processes from polyunsaturated carboxylic acids or monounsaturated carboxylic acid residues of unsaturated alcohols, glycidyl esters, polyglycidyl esters which can be obtained by polymerizing or copolymerizing glycidyl esters of unsaturated acids, or are obtainable from other acidic compounds (cyanuric acid, diglycidyl sulfide, cyclic trimethylene trisulfone, and their derivatives, and others).

Very suitable ethers are, for example, 1,4-butanediol diglycidyl ether, polyglycerol-3 glycidyl ether, cyclohexanedimethanol diglycidyl ether, glycerol triglycidyl ether, neopentylglycol diglycidyl ether, pentaerythritol tetraglycidyl ether, 1,6-hexanediol diglycidyl ether), polypropylene glycol diglycidyl ether, trimethylolpropane triglycidyl ether, bisphenol A diglycidyl ether, and bisphenol F diglycidyl ether.

Likewise outstandingly suitable are epoxidized cyclohexene derivatives with a functionality of at least two, such as, for example, UVACURE® 1500 from CYTEC 3,4-epoxycyclohexylmethyl 3,4-epoxycyclohexanecarboxylate and bis-3,4-epoxy-cyclohexylmethyl adipate.

In the case of a purely heat-activatable polyacrylate layer, the pressure-sensitive adhesiveness of the self-adhesive material may be generated optionally by thermal activation or by solvent activation. Particularly preferred are self-adhesive polyacrylates or the coating of the purely heat-activatable polyacrylate layer with a pressure-sensitive adhesive, more preferably a polyacrylate PSA, it being possible here to use any of the kinds of PSAs that are familiar to the skilled person, and the adhesives, if desired, are anchored by means of a primer or a physical pretreatment on the purely heat-activatable polyacrylate layer.

For transport, storage or diecutting, the adhesive tape is preferably provided on at least one side with a liner, in other words, for example, a silicone-coated film or silicone paper.

A further advantageous embodiment of the invention is the use of a carrier-free adhesive for the self-adhesive tape. A carrier-free adhesive is an adhesive which does not have a permanent carrier, such as a polymer film or a nonwoven. Instead, in a preferred embodiment, the self-adhesive material is applied solely to a liner, in other words to a material which serves only temporarily for the support and greater ease of applicability of the self-adhesive material. After the application of the self-adhesive material to the metal surface, the liner is then removed. In contrast to the layer of the invention, in this case the self-adhesive material, therefore, the liner does not constitute a productive component. The carrier-free adhesive that then remains can be melted particularly easily without adverse effects anticipated from a carrier material.

The layer of the invention can be prepared from solution and also from the melt. For the latter case, suitable preparation procedures encompass not only batch processes but also continuous processes. Particularly preferred is the continuous manufacture by means of an extruder, with subsequent coating directly on a liner with or without layer of adhesive.

In order to optimize the adhesion between the layer of the invention and any subsequent plastisol layer or paint layer, it may be modified. Examples of such modification are physical treatments with corona discharge or plasma, coating with adhesion-promoting substances such as hydrogenated nitrile rubber, vinylidene chloride polymer or adhesion promoters of the kind known to the skilled person for the priming of plastics parts made of polyolefins (for example, automobile fenders) for subsequent paint finishes. Furthermore, the surface for this purpose may also be with a film such as, for example, acrylonitrile-butadiene-styrene copolymer (ABS), caprolactam, cellophane, ethylene-vinyl acetate copolymer (EVA), Kapton, polyester (PEN, PET), polyolefin (PE, PP, etc), polyacrylate (PMMA, etc.), polyamide, polyimide, polystyrene, polyvinyl chloride or polyurethane.

In certain cases, furthermore, a barrier layer is useful in order to prevent migration of plasticizer from the plastisol layer into the corrosion control layer, or migration of plasticizer from the corrosion control layer into a paint layer. Additionally, this layer may result in improved paintability, and also serve as a barrier against gases that emerge from the joints in the painting operation. This may be, for example, a coating with vinylidene chloride polymer or application of a film such as, for example, acrylonitrile-butadiene-styrene copolymer (ABS), caprolactam, cellophane, ethylene-vinyl acetate copolymer (EVA), Kapton, polyester (PEN, PET), polyolefin (PE, PP, etc.), polyacrylate (PMMA, etc.), polyamide, polyimide, polystyrene, polyvinyl chloride or polyurethane.

The melting of the layer of the invention and also the start of the thermal crosslinking by the deblocking of the crosslinker and also the release of the accelerant ought to take place only at not less than 90° C., preferably at not less than 110° C., more preferably at not less than 130° C. The minimum temperature required in each case is determined by the specific composition of the self-adhesive material. This temperature ought on the one hand to be selected as high as possible, in order to provide the self-adhesive material with the maximum storage stability; on the other hand, however, the temperature ought not to be too high, in order that the melting and crosslinking can be carried out in as energy-optimized manner as possible and also that further components used, for example, in a motor vehicle body are not subjected to excessively high temperatures. As a maximum temperature, therefore, a temperature of not more than 200° C., preferably of not more than 180° C., more preferably of not more than 160° C. has been found appropriate for the melting of the self-adhesive material.

The layer of the invention ought to be applied to the metal surface with a layer thickness of least 50 µm, preferably of at least 100 µm, more preferably of at least 200 µm. Moreover, the layer thickness ought to be not more than 750 µm, preferably not more than 600 µm, more preferably not more than 400 µm. The selection of such a layer thickness ensures that, on the one hand, the metal surface is sufficiently covered during the melting and crosslinking of the self-adhesive material, while on the other hand the thickness of the corrosion control layer does not become too great.

In the automobile industry sector in particular it is often necessary to apply corrosion control layers manually, in other words by hand, to the metal surface. This is done in the present case by applying the self-adhesive tape manually to the metal surface and subsequently causing it to go through a corresponding heat procedure. It is particularly important in this case that the self-adhesive tape is benign in terms of health, in other words posing no health hazard to the worker on handling of the adhesive tape. For handling, therefore, there is no need in particular for any further protective measures, such as respiratory protection, secured storage and/or chilled storage or the like.

For application, it has emerged as being particularly suitable if the self-adhesive composition is first wound onto a roll and is applied from this roll to the metal surface. The worker can then separate off the self-adhesive material in the required length. In order to allow the self-adhesive material to be wound onto a roll, it is typically covered on one side with a liner. The liner enables easy unwind of the self-adhesive material from the roll, and thereby facilitates handling.

For certain applications, presentation in the form of diecut parts may also be of advantage. For this purpose, the desired shapes are diecut from the adhesive tape, and typically applied to a liner. This construction may then be processed either into a roll or into individual sheets. It is immaterial here whether diecuts of different or equal shape are assembled on a liner.

The present invention provides, furthermore, for the use of a self-adhesive tape with the polyacrylate layer of the invention for the corrosion control treatment of metal surfaces. The self-adhesive material is selected and embodied in particular in accordance with the features described above. Furthermore, the adhesive after melting has taken place ought to have a very high temperature resistance, in order to allow as diverse applications as possible for the corrosion-control-treated metal surfaces. Provision is made in particular for the adhesive, after melting has taken place, to be temperature-resistant to −5° C., preferably to −15° C., more preferably to −30° C. Moreover, the adhesive after melting has taken place ought also to be temperature-resistant to 70° C., preferably to 80° C., more preferably to 100° C.

The general expression "adhesive tape" for the purposes of this invention encompasses all sheetlike structures such as two-dimensionally extended films or film sections, tapes with extended length and limited width, tape sections and the like, and lastly also diecuts or labels.

In the text below, the invention is illustrated with reference to an example, without thereby restricting the invention.

EXAMPLE 1

A polyacrylate (3% by weight acrylic acid, 45% by weight butyl acrylate, and 52% by weight 2-ethylhexyl acrylate; $M_n$=514 000 g/mol as measured by GPC) was formulated as a self-adhesive material with 30% by weight of terpene-phenolic tackifying resin Dertophene DT110 (based on polymer) from DRT Resins, France, and also with the crosslinker combination of 1% by weight of Dyhard® UR 500 and 0.8% by weight of Polypox R16 from UPPC AG (based on polymer), and was adhered with a thickness of 300 µm over the edge of two cathodically electrocoated metal panels.

These panels were subsequently heated, together with the self-adhesive material, to about 140° C. for 40 minutes. Heating resulted in the melting of the self-adhesive material onto the metal surface, and in the initiation of the crosslinking of the self-adhesive material, thus causing a corrosion control layer to form. After the metal panels had cooled, the surface of the corrosion control layer was found to be smooth. The panel edge between the two metal panels remained visible, but the surface of the original polyacrylate material was smooth and did not exhibit any directly visible adverse effects.

The metal panels were subsequently subjected to different ambient conditions. For this purpose, the temperature was varied in alternation between about −5° C. and 70° C. The elasticity of the original polyacrylate material remained largely retained, with a reduced risk, consequently, of delamination of the corrosion control layer.

Furthermore, a painting test was performed as well, and showed that the polyacrylate material could be painted directly after having been melted.

The invention claimed is:

1. A method for the corrosion control treatment of metal surfaces, especially at edges and transitions of the metal components comprising applying a self-adhesive tape to the metal surface and heating the self-adhesive tape, wherein the self-adhesive tape comprises at least one layer with a material such that when the self-adhesive tape is heated the material melts onto the metal surface and so forms a corrosion control layer, wherein a polyacrylate material with a tackifier having tackifying resins as principal component is used as material of the layer of the self-adhesive tape, and a combination of a polyfunctional epoxide and a urethane derivative and/or urea derivative is used for crosslinking the polyacrylate material, wherein the crosslink does not occur before the melting temperature of the polyacrylate is reached.

2. The method of claim 1, wherein the self-adhesive tape on melting forms a substantially smooth surface.

3. The method of claim 1 wherein a pressure-sensitive adhesive is used as material of the at least one layer of the self-adhesive tape.

4. The method of claim 3 wherein a heat-activatable polyacrylate material which becomes pressure-sensitively adhesive only through heat activation is used as material of the at least one layer of the self-adhesive tape.

5. The method of claim 4 the polyacrylate material is melted at not less than 90° C.

6. The method of claim 1 wherein the polyacrylate material is crosslinked at not less than 90° C.

7. The method of claim 5 wherein the polyacrylate material is melted at not more than 200° C.

8. The method of claim 1 wherein a carrier-free adhesive tape is used as self-adhesive tape with the at least one polyacrylate layer.

9. The method of claim 1 wherein the polyacrylate layer of the self-adhesive tape is applied with a layer thickness of at least 50 µm, and of not more than 750 µm.

10. The method of after melting and crosslinking have taken place, the corrosion control layer itself is painted or a further, paintable layer is applied to the corrosion control layer, and this further layer is subsequently painted.

11. The method of claim 1 wherein the self-adhesive tape is applied manually to the metal surface.

12. The method of claim 1 wherein the polyacrylate material and the crosslinkers are both benign in health terms.

13. The method of claim 1 wherein the self-adhesive tape is applied to the metal surface from a roll and separated off in the required length.

14. The method of claim 1 wherein the self-adhesive tape, after melting has taken place, is temperature-resistant to −5° C.

15. The method of claim 14 wherein the self-adhesive tape, after melting has taken place, is temperature-resistant to 70° C.

16. The method of claim 1 wherein the urethane or urea derivative has at least two urea functionalities.

* * * * *